Oct. 7, 1958 E. F. TIJS 2,855,580

MOUNTING ARRANGEMENT FOR ELECTRICAL CIRCUIT COMPONENTS

Filed Feb. 2, 1954

Inventor
E. F. TIJS
By R.F. Morris
Attorney

1

2,855,580

MOUNTING ARRANGEMENT FOR ELECTRICAL CIRCUIT COMPONENTS

Eugene Florent Tijs, Antwerp, Belgium, assignor to International Standard Electric Corporation, New York, N. Y., a corporation of Delaware Application February 2, 1954, Serial No. 407,726

Claims priority, application Belgium March 5, 1953

1 Claim. (Cl. 339—198)

This invention relates to a mounting arrangement for mounting the components of an electrical circuit to form a single unit. More particularly, the invention relates to an assembly of electrical components associated with an electron tube or valve.

There are known removable mounting arrangements which comprise a valve socket and a pin carrying base interconnected by spacing-pieces perpendicular to the plane of the valve socket or of the base. A central spacing piece also interconnecting the valve socket and the base carries insulating plates with tags.

The electrical components of the circuit are then coupled between the socket pins and the plate tags, and the outgoing wire ends are connected to the base pins.

Non-removable arrangements are also known, in which the valve socket is generally extended by a central insulating part carrying soldering tags, the circuit elements being mounted between these tags. The external connections are soldered directly either on the valve socket or on the tags of the central insulating part according to the circuit characteristics.

In said arrangements, the soldering tags are spread either on the periphery of the insulating plates mounted perpendicularly on the central part, or on the periphery of the central part itself, if said part is of insulating material.

In all cases, the plates or the central part must have a sufficient peripheral surface to allow a reasonable number of tags to be fixed thereon without touching each other.

The space occupied by the central part is lost to the detriment of the total bulk. Further, the arrangement of the soldering tags results often in rather long connections which might cause undesirable couplings.

The object of the present invention is to overcome these drawbacks.

According to a feature of the invention, the mounting arrangement comprises a valve socket maintained in parallel direction to a plate carrying tags by means of two spacing pieces also carrying tags.

According to another feature of the invention, the components of an electrical circuit are soldered between the socket pins and one or more tags of the spacing pieces, the external connections of the components being all made on the plate tags.

The above mentioned and other objects and features of the invention will become more apparent and the invention itself will be best understood by referring to the following description of an embodiment taken in conjunction with the accompanying drawings in which.

2

Figure 4:
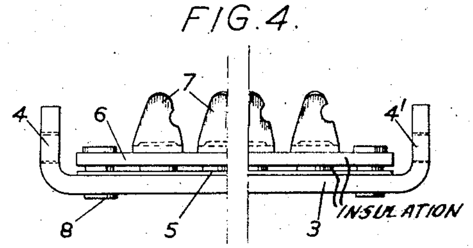
Figure 5:
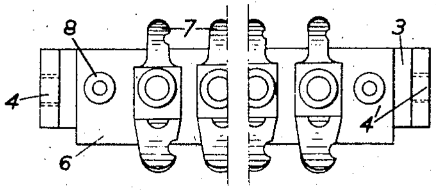
Figure 2:
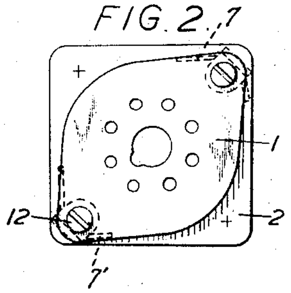
Fig. 2 shows a plan view of the same arrangement seen from the socket side.
Figure 6:
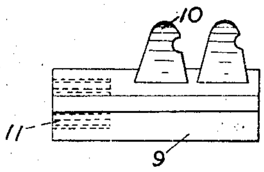
Figure 7:
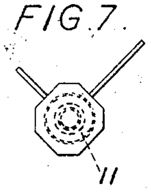
Figure 3:
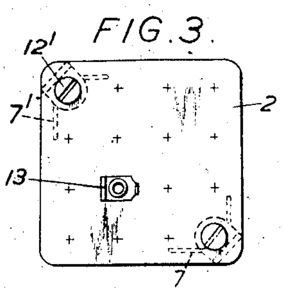
Fig. 3 shows a plan view of the same arrangement seen from the plate side.
Figure 8:
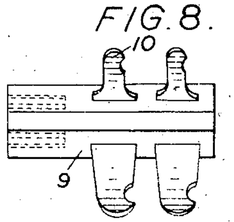

Fig. 4 shows a front view of a spacing piece according to a preferred embodiment of the invention;

Fig. 5 shows a plan view of the same spacing piece;

Fig. 6 shows a partial front view of a moulded spacing piece according to the invention;

Fig. 7 shows a side view of the same moulded spacing piece;

Fig. 8 shows a partial plan view of the same moulded spacing piece.

Figure 1:
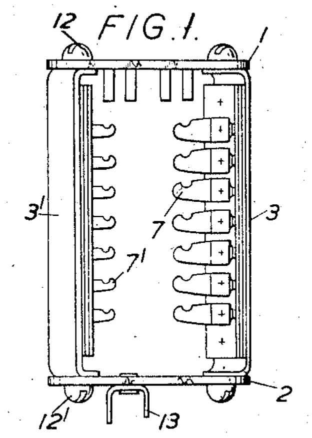
Fig. 1 shows a front view of the mounting arrangement according to the invention.

Fig. 1 shows a mounting arrangement comprising a radio valve socket 1 and a plate 2 interconnected by spacing pieces 3, 3' of equal length. The spacing pieces 3, 3' serve on the one hand for the mechanical interconnection between the socket 1 and the plate 2, on the other hand as a support for the electrical connections of the components which have to be connected to said socket 1 or to said plate 2.

The spacing pieces 3, 3' as shown in Figs. 4 and 5, comprise each a metallic U-shaped frame of which each wing is drilled and tapped at holes 4, 4'. An insulating plate 5 and a tag carrying strip 6 are fixed to the body of the U-shaped frame. In the example shown in Figs. 4 and 5, the parts 5 and 6 are fixed to the frame by means of one or more rivets 8, but the fixing could be made by any other suitable means. The parts 5 and 6 could also constitute a single unit (not shown) obtained by moulding.

Figs. 6, 7 and 8 show a mounted spacing piece 9 which does not require any metallic frame. In that case, the spacing piece 9 comprises a number of tags 10 and tapped fixing parts, such as 11, impressed in the material according to a known technique. The cross section of such a spacing piece is sufficient to support a certain amount of mechanical stress.

Spacing pieces 3, 3' with a metallic frame or moulded spacing pieces 9 are assembled with the socket 1 and the plate 2 by means of screws 12, 12'. If required the spacing pieces of the one or the other type may carry more than one row of tags.

Concerning the mounting in general, the distance between the spacing pieces from axis to axis is determined by the distance separating the fixing holes of the socket. The plate 2 has therefore two holes at the same distance than the fixing holes of the socket 1 and located preferably along a diagonal of said plate. The mounting arrangement can be fixed either to a framework, or to a panel or to any other suitable kind of support by means either of the screws 12, 12', or of any suitable fixing means serving for the assembly of the socket 1 or of the plate 2. Free spaces must be provided in the part serving as support to clear the pin holes of the socket 1. In all cases the mounting of the components which constitute the electrical circuit can be made with very short connections, the arrangement of components being by no means limited and the space between socket and plate being available for placing components.

Said components can be soldered for instance, either between tags 7 and 7', or else between the socket pins and one or more tags 7 or 7'. . . . All the arrangements make possible maximum use of the available space within the limits of the described arrangement.

Finally, all the wire ended circuit components which must have access to the exterior of the mounting arrangement, are connected to the tags 13 of the plate 2.

While the principles of the invention have been described above in connection with specific embodiments and particular modifications thereof, it is to be clearly understood that this description is made only by way of example and not as a limitation on the scope of the invention.

What is claimed is:

A mounting device for electrical circuit components including a thermionic valve, comprising a valve socket, a plate member spaced from and parallel to said socket, a pair of spacing members located at diametrically opposed portions of the socket and extending substantially perpendicular to and joining the socket and plate member, a plurality of soldering tags each comprising two elements angularly disposed with respect to one another in a plane parallel to said plate member, means mounting said tags in alignment on the respective spacing members with the angle vertex portions of the tags attached to the spacing members, the soldering tags on each of said spacing members being insulated from each other and the opening of the angles of the tags on one spacing member facing the opening of the angles of the tags on the other spacing member, whereby a circuit component may be coupled from any one of the tags on one spacing member to any one of the tags on the other spacing member.

References Cited in the file of this patent

UNITED STATES PATENTS

| | | |
|---|---|---|
| 2,268,619 | Reid | Jan. 6, 1942 |
| 2,405,554 | Barbour | Aug. 14, 1946 |
| 2,604,584 | Scoville | July 22, 1952 |
| 2,624,775 | Hughes | Jan. 6, 1953 |
| 2,637,763 | Palmer | May 5, 1953 |
| 2,720,578 | Caffiaux et al. | Oct. 11, 1955 |
| 2,721,981 | Modrey | Oct. 25, 1955 |